June 19, 1951 — A. W. DUNCAN — 2,557,418

ROLLER FOR BELT CONVEYERS

Filed Aug. 14, 1945

INVENTOR
Angus W. Duncan
BY
ATTORNEY

Patented June 19, 1951

2,557,418

UNITED STATES PATENT OFFICE 2,557,418

ROLLER FOR BELT CONVEYERS

Angus Wellesley Duncan, Worcester, England, assignor of one-half to The Mining Engineering Company Limited, Worcester, England Application August 14, 1945, Serial No. 610,775
In Great Britain August 14, 1944

15 Claims. (Cl. 308—20)

Oil lubricated ball-bearing carrying rollers and idler rollers for belt conveyors having communicating oil retaining tubes between the bearing housings and having oil seals external of the bearings are well known. The present invention provides a roller in which the combination and arrangement of parts is such as to avoid the normal need of making an oiltight joint between the communicating tubes and the bearing housings; there is very little machining required and the roller can be of light weight with adequate strength, to facilitate handling under mining or like conditions.

In a roller according to the invention the bearings and oil sealing means are mounted in a tubular member to form an enclosed inner assembly which can be filled with lubricant and from which the surrounding roller shells can be suitably spaced and secured. In typical forms the inner assembly is located between end pieces attached to the roller shell and in the preferred forms end plates, dished to form end caps for the inner assembly, are permanently attached to the outer shell.

Other parts of the invention are embodied in typical forms which will now be described by way of example and illustrated by the accompanying drawings in which—

Figure 1:
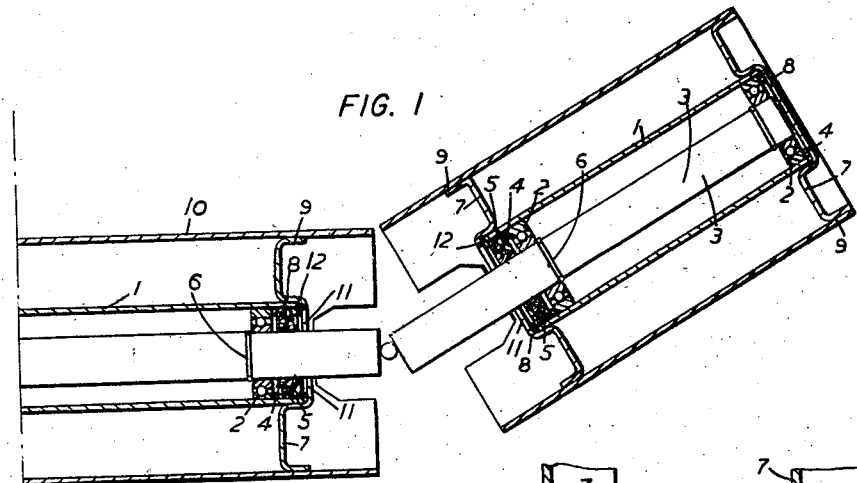
Fig. 1 shows in central vertical section the right hand half of a set of idler rollers for carrying a troughed belt.
Figures 4, 5:
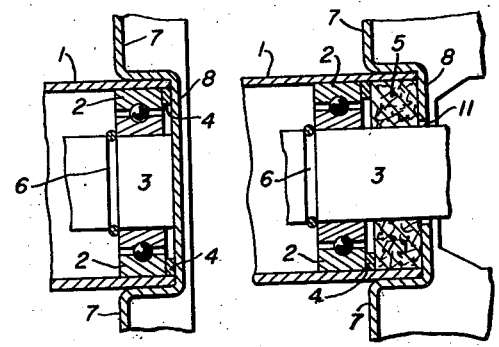
Figure 4 is a detail of one of the outer ends shown at the right in Figure 1 or at the left in Figure 2.
Figure 5 is a detail of one of the inner bearings shown in Figure 2.

In the form of Fig. 1, which can be dismantled for servicing, the roller comprises an inner tubular shell 1 of suitable internal diameter to carry the ball bearings 2, spindle 3, spacing rings 4 external of the bearings and oil seals 5 of conventional form external of the spacing rings 4. Circlips, snap rings or the like 6 demountably fixed as by fitting in peripheral grooves in the spindle 3 for engagement by and against the inner sides of the antifriction or ball bearings 2 keep the bearings longitudinally spaced apart on the spindle toward and from the ends thereof. This inner assembly is located between pressed steel end plates 7, with an outwardly pressed central dished portion 8 fitting on and against the end of the tube 1 and an external outturned peripheral flange 9 fitting and spot welded into the outer shell 10 at or spaced from its ends. It should be noted that each of tubes or tubular shells 1 and 10 are made of stock material of uniform internal and external diameters throughout their lengths to avoid special construction and facilitate economical mass production. Also, one end plate 7 is imperforate including its dished portion 8 where spindle 3 terminates short thereof and substantially coincident with the adjacent end of tube 1 and the outer side of one bearing or bearing assembly to close and form an oil seal at said end of tube 1, while the other end plate 7 is perforate, its dished portion 8 having a central aperture 11. The central aperture 11 at one end such as the end through which the extended end of spindle 3 projects, is at least as large as the inside diameter of tube 1 and thus large enough to permit of the spindle, bearings and oil seals being withdrawn from the tube and serviced by removing a circlip, snap ring or the like located in a space between the end of the inner tube 1 and the apertured end of the plate 7 or inturned flange formed by the aperture 11 in the outpressed dished portion 8 thereof.

Figure 2:
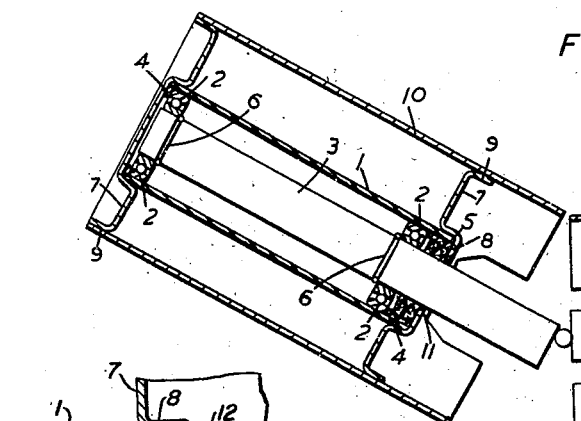
Fig. 2 shows in central vertical section the left hand half of a set of slightly modified form which is intended to last for its full life without servicing.
Figure 3:
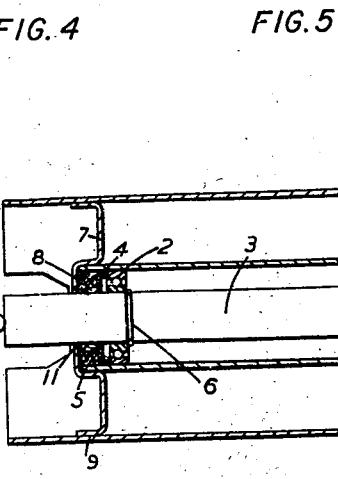
Figure 3 is a detailed section of one of the inner bearings of Figure 1.

In the form of Fig. 2, which is not intended to be serviced during its life, the construction is similar but the central apertures 11 are smaller in diameter than the inside diameter of the inner tube 1 and the outside diameters of bearings 2, spacing rings 4, oil seals or packings 5 and snap rings 6, preferably just clearing the spindle 3, and the end plates 7 locate and retain the inner tubular assembly without circlips or snap rings 12.

In both forms manufacture will consist of the assembly of the inner unit with spindle, bearings, oil seals and lubricant, fitting of this unit within the outer shell between the end plates 7 (after inserting the circlips or snap rings 12 in the type of Fig. 1) and spot welding the end plates to the outer shell.

It will be appreciated that the inner tubular assembly is an oil tight unit closed at either end by the oil seals and independent of metal to metal joints and machining accuracy for oil-tightness.

The arrangement described for both types can be used in troughed idler construction, either with the spindle of the side roller overhung, as shown, or brought out to a supporting bracket at the outer end as will be apparent without illustration. In the former case, the outer end of the roller is closed as shown by leaving the end plate 7 unpierced or imperforate especially at the inner annular radial portion or flange within the cylindrical portion of outpressed dished portion 8, to form an oil seal. At that end, it will also be apparent that the permanent oil sealing means could include an oil-tight plug in the end of the tube external to the bearing or a joint between the tube and the end plate.

I claim:

1. A roller having a spindle, longitudinally spaced anti-friction bearings mounted and held on the spindle by demountable means on the spindle directly against the inner sides of the bearings, an assembly housing the anti-friction bearings and rotatable about the spindle, said assembly including an oil-tight inner tube, end caps forming radial spacing means, an oil seal between one bearing and an end cap, a spacing ring fitted within the tube between said bearing and said oil seal, and an outer shell spaced from said inner tube and supported by the end caps, said end caps being separate from the shell and said tube and shell each being of uniform internal and external diameters throughout its length, all the parts of said assembly being permanently secured together by welding of the end caps to said outer shell.

2. A roller as in claim 1, having at least one oil seal fitted on a spindle end between the spindle and the inner tube, and at least one of the said end caps formed with an aperture of smaller diameter than the inside of the inner tube and larger than that of the spindle to receive one spindle end therethrough and the other end cap embracing the other spindle end, to retain the seals and the bearings in the inner tube.

3. A roller as in claim 1, having at least one oil seal fitted between the spindle and the inner tube, at least one of the said end caps being formed with an aperture of a diameter at least as great as that of the inside of the inner tube, and a snap ring fitted between one end of the inner tube and an end cap arranged to retain the seals and the bearings in the inner tube.

4. A roller as in claim 1, one of the said end caps being apertured for the passage of the spindle only but to prevent displacement of the bearing and oil seal and the other end cap enclosing the bearing and end of the spindle in the tube.

5. A roller as in claim 1, in which the anti-friction bearings are located between the said end caps, snap rings engaging the spindle against the inner sides of the bearings, and spacing rings within the tube and acting against the outer sides of the bearings.

6. A roller having a spindle, longitudinally spaced ball bearings mounted on the spindle, demountable members on the spindle at the inside of the bearings to hold the bearings in position so spaced near each end, a single piece inner tube of uniform thickness throughout its length rotatable about the said spindle and housing the said bearings and extending to the outside of said bearings at each end, means at each end of the tube to seal the tube against oil leakage from the tube beyond the bearings, an outer shell comprising a hollow cylinder integral and of uniform wall thickness throughout its length, demountable members outwardly of the bearings, and end members with outwardly pressed dished portions forming end caps at the ends of said tube against certain of said last-mentioned demountable members, and spindle at one end, one of said end members being apertured for extension of the other spindle end therethrough, the said members having radially extending portions carrying and permanently secured to the said outer shell.

7. A roller having a spindle, snap rings engaging the spindle near its ends at a fixed spacing, ball bearings mounted on the spindle outwardly of and against said snap rings and spaced apart by the snap rings, an assembly housing the ball bearings and rotatable about the spindle, said assembly comprising an oil-tight inner tube of uniform internal and external diameter throughout, an outer shell, and end caps having outturned peripheral flanges secured to the inside of the outer shell and having outwardly dished central portions against the ends of the inner tube, said end caps forming radial spacing means.

8. A roller assembly comprising a single piece spindle, a pair of anti-friction bearing assemblies mounted on said spindle, at least one of which includes an oil sealing element, a pair of demountable elements spaced on said spindle toward its ends to maintain said bearings in spaced relationship, an oil tight tube of uniform internal and external diameter mounted on said bearing assemblies and with its ends extended to the outer sides of said bearing assemblies, end caps mounted on the ends of said tube and extending radially from said tube with portions extending inwardly of the ends of said tube to retain said bearing assemblies within said tube and on said spindle against said spacing elements, and a roller forming outer tube mounted on the peripheries of said end caps and rigidly secured to said caps to retain them in assembly retaining position.

9. A roller as set forth in claim 8, wherein both bearing assemblies include oil seals.

10. A roller as set forth in claim 8, wherein one of the end caps closes the tube at one end and an oil seal is positioned on the spindle between the bearing and an end cap at the other end.

11. A roller as set forth in claim 8, wherein both ends of said tube are sealed outwardly of the bearings against the escape of oil.

12. A roller for belt conveyors having a spindle, an inner oil containing tube rotatable about the spindle separately closed at one end outwardly of and adjacent one end of the spindle and apertured at the other end for extension of the other spindle end therethrough, anti-friction bearings mounted on the spindle within and adjacent to said ends of the tube and held in longitudinally spaced relation by demountable means on the spindle at the inside of the bearings, means including said closed end to seal the tube ends against oil leakage, and an outer surrounding shell secured to and over the ends of the inner tube to rotate therewith.

13. A roller having a spindle, an inner oil containing tube rotatable about the spindle, closed at one end and apertured at the other end, anti-friction bearings mounted on the spindle and housed directly in the end portions of the tube, means to close and seal the ends of the tube against oil leakage and enclosing the bearings, and an outer surrounding tubular shell secured to the inner tube, said means including a packing on one end of the spindle outwardly of the bearing between the spindle and tube, and one of two end plates separate from and anchored within and to the shell over and against the ends of the inner tube and one end of the spindle externally of the bearings.

14. A roller having a spindle, an inner oil containing tube rotatable about the spindle, closed at one end and apertured at the other end, antifriction bearings mounted on the spindle and housed directly in the end portions of the tube, an outer shell surrounding and spaced from said inner tube, and end plates separate from the outer shell, having outturned peripheral flanges welded within and to the outer shell, said plates having outpressed central dished portions, with outwardly extending and radial portions disposed over and against the ends of the inner tube and one end of the spindle externally of the bearings, said outer surrounding tubular shell being secured to the inner tube.

15. A roller having a spindle, an inner oil containing tube rotatable about the spindle, closed at one end and apertured at the other end, antifriction bearings mounted on the spindle and housed directly in the end portions of the tube, an outer shell surrounding and spaced from said inner tube, end plates separate from the outer shell, having outturned peripheral flanges welded within and to the outer shell, said plates having outpressed central dished portions, with outwardly extending and radial portions disposed over and against the ends of the inner tube and one end of the spindle externally of the bearings, said outer surrounding tubular shell being secured to the inner tube, one of said plates having its dished portion imperforate to close one end of the inner tube over the one spindle end and form a seal against oil leakage, and the dished portion of the other end plate being perforate to form an inward flange with the other spindle end extending therethrough, and a packing detachably held in the inner tube on the latter spindle end within the tube between the adjacent bearing and inward flange of the perforate end plate to seal said end against oil leakage.

ANGUS WELLESLEY DUNCAN.

REFERENCES CITED

The following references are of record in the file of this patent:

UNITED STATES PATENTS

| Number | Name | Date |
| --- | --- | --- |
| 1,156,386 | Armstrong | Oct. 12, 1915 |
| 1,278,060 | Swenson | Sept. 3, 1918 |
| 1,427,320 | Philips | Aug. 29, 1922 |
| 1,782,973 | Persons | Nov. 25, 1930 |
| 2,207,790 | Fairbairn et al. | July 16, 1940 |
| 2,264,635 | Graham | Dec. 2, 1941 |
| 2,285,647 | Deems et al. | June 9, 1942 |
| 2,287,357 | Nyborg | June 23, 1942 |
| 2,278,363 | Broshkevitch | Mar. 31, 1942 |

FOREIGN PATENTS

| Number | Country | Date |
| --- | --- | --- |
| 73,503 | Sweden | Aug. 27, 1929 |